US008387261B2

(12) United States Patent
Voyer et al.

(10) Patent No.: US 8,387,261 B2
(45) Date of Patent: Mar. 5, 2013

(54) ROOT RESURFACING ATTACHMENT FOR HAND HELD GAS POWERED EDGERS

(75) Inventors: Jeff Carl Voyer, Middleburg, FL (US); William Donald Peacock, Fleming Island, FL (US)

(73) Assignee: RBGone Inc., Fleming Island, FL (US)

( * ) Notice: Subject to any disclaimer, the term of this patent is extended or adjusted under 35 U.S.C. 154(b) by 0 days.

(21) Appl. No.: 13/430,605

(22) Filed: Mar. 26, 2012

(65) Prior Publication Data

US 2012/0180906 A1 Jul. 19, 2012

Related U.S. Application Data

(63) Continuation-in-part of application No. 13/068,568, filed on May 16, 2011, now abandoned.

(60) Provisional application No. 61/396,594, filed on Jun. 1, 2010.

(51) Int. Cl.
| *A01D 34/416* | (2006.01) |
| *A01D 34/73* | (2006.01) |
| *A01G 3/08* | (2006.01) |
| *A01G 23/00* | (2006.01) |

(52) U.S. Cl. .............................. 30/276; 83/830; 144/2.1

(58) Field of Classification Search .............. 30/76, 276, 30/292; 56/11.9, 256, 16.7, 12.1, 12.7, 12.8, 56/16.9, 17.2; 83/122, 331, 411.1, 830; 172/30, 172/37, 47, 56, 280, 171, 22, 25, 24, 85, 172/100, 13–17; 144/2.1
See application file for complete search history.

(56) References Cited

U.S. PATENT DOCUMENTS

| 2,241,383 | A | | 5/1941 | Barnett |
| 3,011,564 | A | * | 12/1961 | Dahlgren ........................ 172/50 |
| 3,086,596 | A | | 4/1963 | Allegretti et al. |
| 3,852,944 | A | | 12/1974 | Zuercher |
| 4,002,205 | A | | 1/1977 | Falk |
| 4,924,571 | A | | 5/1990 | Albertson |
| 5,490,371 | A | | 2/1996 | Potucek, III |
| 7,237,620 | B2 | | 7/2007 | Abenroth et al. |

* cited by examiner

*Primary Examiner* — Ghassem Alie
(74) *Attorney, Agent, or Firm* — Mark Young, P.A.

(57) ABSTRACT

A rotating cutting head includes multiple, separate, spaced-apart, parallel loops of chainsaw chains positioned around a central hub. The hub is attached to a spindle of a lawn edger. A safety shield is provided adjacent to the rotating cutting head. As the cutting head rotates, the chainsaw chains cut the tree roots. The rotating cutting head is used for resurfacing exposed tree roots to avoid tripping hazards and tree root strike damage to residential and commercial lawn maintenance equipment.

20 Claims, 11 Drawing Sheets

ROOT RESURFACING ATTACHMENT FOR HAND HELD GAS POWERED EDGERS

RELATED APPLICATION

This application is a continuation in part and claims the benefit of priority of U.S. Nonprovisional application Ser. No. 13/068,568 filed on May 16, 2011, which is a nonprovisional and claims the benefit of priority of U.S. Provisional Patent Application No. 61/396,594 filed on Jun. 1, 2010, the entire contents of which are incorporated herein by this reference and made a part hereof.

FIELD OF THE INVENTION

This invention relates generally to landscaping, and, more particularly, to root resurfacing attachment for gasoline powered edgers.

BACKGROUND

When professionals such as landscapers; golf course maintenance crews; lawn maintenance and property managers, as well as individual homeowners attempt to cut the grass and maintain their lawns; they often encounter tree roots and even cypress knees that protrude above of soil level. If a homeowner or professional attempts to use lawn mowing equipment over the exposed root, the chances are great that the spinning blade of the equipment will end up striking the protruding root and sustain substantial damage to one or more of the mower blade, spindle shaft, deck housing or even the motor. Tree root strike damage could render the equipment totally inoperable. The cost of repairs and or replacement could be substantial.

Managers of golf course greens, public parks and recreational areas are able to resurface exposed tree roots that have become tripping hazards to prevent or avoid possible lawsuits from injured parties. However, most homeowners and small commercial landscapers lack an appropriate tool for conveniently resurfacing a root. Many who encounter roots are tempted to inappropriately use the tip of a chain saw for resurfacing. However, this is highly inappropriate chain saw use and risks kickback damage to the saw and injury to the user.

Several types of gas powered edging devices are currently available for residential and profession use. Unfortunately, these devices are not well suited for grinding down (i.e., resurfacing) protruding tree roots. When such devices are used to resurface a root, surrounding soil severely dulls and eventually destroys the cutting edges of the blade.

U.S. Pat. No. 4,924,571 to Albertson describes a cutting tool suitable for girdling a tree and cutting through tree branches and small tree trunks. The cutting tool is frustoconical in shape and has a single length of chainsaw chain wrapped in a spiral groove around the outside face of frustoconical body. A steel pin secures the one end of the chain to the body. The opposite end is maintained using an adjustment screw and an adjustment cylinder. The frustoconical shape results in different cutting speeds at different axial locations.

Additionally, to achieve cutting throughout the axial length, the Albertson device must be tilted. However, because of the different speeds, such a device has a strong tendency to travel in a circular path, making stabilization extremely difficult. Another problem is inevitable loosening of the chain. The pin and screw in Albertson are prone to failure, as they are subjected to considerable impacts and stresses during operation. If either end becomes free, the device is extremely dangerous and self-destructive. If both ends become free, the chain becomes a dangerous projectile.

Another problem is that the Albertson device does not allow adjacent rows of saw teeth to be positioned in a preferred arrangement. The chain configuration and geometry of the frustoconical body determine the arrangement of adjacent rows of saw teeth. Thus two right angled teeth may be adjacent to one another resulting in an uneven cutting path. Moreover, the saw teeth are traveling at a less than optimal angled path, rather than a straight path. Chain saw blades are designed to cut when moving in a straight path. The angled path exaggerates or diminishes cutting angles of the toothed blades relative the cutting surface. The angled arrangement also tends to urge the chain laterally off the sprocket.

Yet another problem with the Albertson device is that one damaged tooth may require replacement of the entire length of chain. Frequently one tooth is damaged upon encountering a small stone.

The invention is directed to overcoming one or more of the problems and solving one or more of the needs as set forth above.

SUMMARY OF THE INVENTION

To solve one or more of the problems set forth above, in an exemplary implementation of the invention, a root resurfacing attachment for a landscaping edger has a rotating threaded spindle, the root resurfacing attachment includes a rotating hub. The rotating hub includes an axial core with an inboard end and an opposite outboard end, an inboard flange with a first outer diameter at the inboard end, a plurality of evenly spaced ribs extending radially from the axial core, a central bushing channel with a noncircular cross section extending from the inboard flange into the axial core, and a central flange channel extending from the outboard end of the axial core to the central bushing channel. The ribs define a second outer diameter. A removable outboard flange assembly attaches to the outboard end of the rotating hub. The outboard flange assembly has a third outer diameter. An outboard flange attachment such as a threaded bolt or screw attaches the removable outboard flange assembly to the outboard end of the rotating hub. An inboard spindle bushing has a noncircular cross section sleeve configured to fit snugly in the central bushing channel, and a central threaded channel extending axially through the inboard spindle bushing and being threaded to threadedly engage the rotating threaded spindle of the landscaping edger. A plurality of parallel spaced-apart endless cutting chain loops are provided on the hub. Each cutting chain loop has an inner periphery and inner diameter, an outer periphery and outer diameter. Each cutting chain loop comprises an endless loop of connected chainsaw chain links, including a plurality of cutting links, drive links, and tie straps. Each cutting link includes a cutting surface at the outer periphery. Each drive link includes a rib engaging fin at the inner periphery. A plurality of spaced-apart spacer rings keep the adjacent cutting chain loops separated without interfering with cutting. Each spacer ring has an inner periphery and inner diameter, an outer periphery and outer diameter, and a width. Each spacer ring is disposed between adjacent cutting chain loops. The outer diameter of the spacer rings is less than the outer diameter of the cutting chain loops, so that the spacer rings do not interfere with cutting. The inner diameter of the spacer rings allows the spacer rings to slide onto the rotating hub. The first outer diameter is greater than the second outer diameter and the third outer diameter is greater than the second outer diameter.

The outboard flange attachment may comprise a bolt with a threaded shank configured to extend through the central flange channel and threadedly into the inboard spindle bushing within the central bushing channel.

The plurality of evenly spaced ribs extending radially from the axial core of the hub define a plurality of grooves, including one groove between each adjacent pair of evenly spaced ribs. The rib engaging fin of each drive link is shaped and sized to extend into one of the grooves between each adjacent pair of evenly spaced ribs. The grooves may be curved and include features such as protuberances, which mates with and corresponds to complementary features in the fins. Thus the drive links may be configured to be driven in one rotational direction for cutting.

Each cutting surface of each cutting link may comprise a top plate, cutting corner, heel, gullet, side plate, depth gauge, toe, and rivet holes. The plurality of cutting links includes right-hand cutters and left-hand cutters. Each of the cutting links has a cantilevered top plate with a free end. Cutting links on adjacent cutting chain loops may be aligned. In such case, the width of spacer ring is sufficient to prevent cutting links from contacting an adjacent cutting chain loop.

A shield assembly may be disposed between the rotating hub and a user. A connecting arm assembly attaches the shield assembly to a shaft of the landscaping edger. The shield assembly may include a base to which the connecting arm assembly attaches and a skirt extending downwardly from the base. The connecting arm assembly may be a one-piece arm or a multi-piece jointed arm. A forked end clamps the shaft of the landscaping edger.

A landscaping tool equipped with such a root resurfacing attachment may be used to efficiently grind exposed roots. The grinding occurs substantially evenly along the axial length of hub. A single chain loop may be replaced as needed. There chain loops have no free ends that may come loose. A shield protects a user from flying debris. The action of the chainsaw teeth of the cutting head, rotating clockwise at about 1000 to 4000 rpm, cuts, grinds down or resurfaces the protruding tree roots to the soil level very efficiently.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
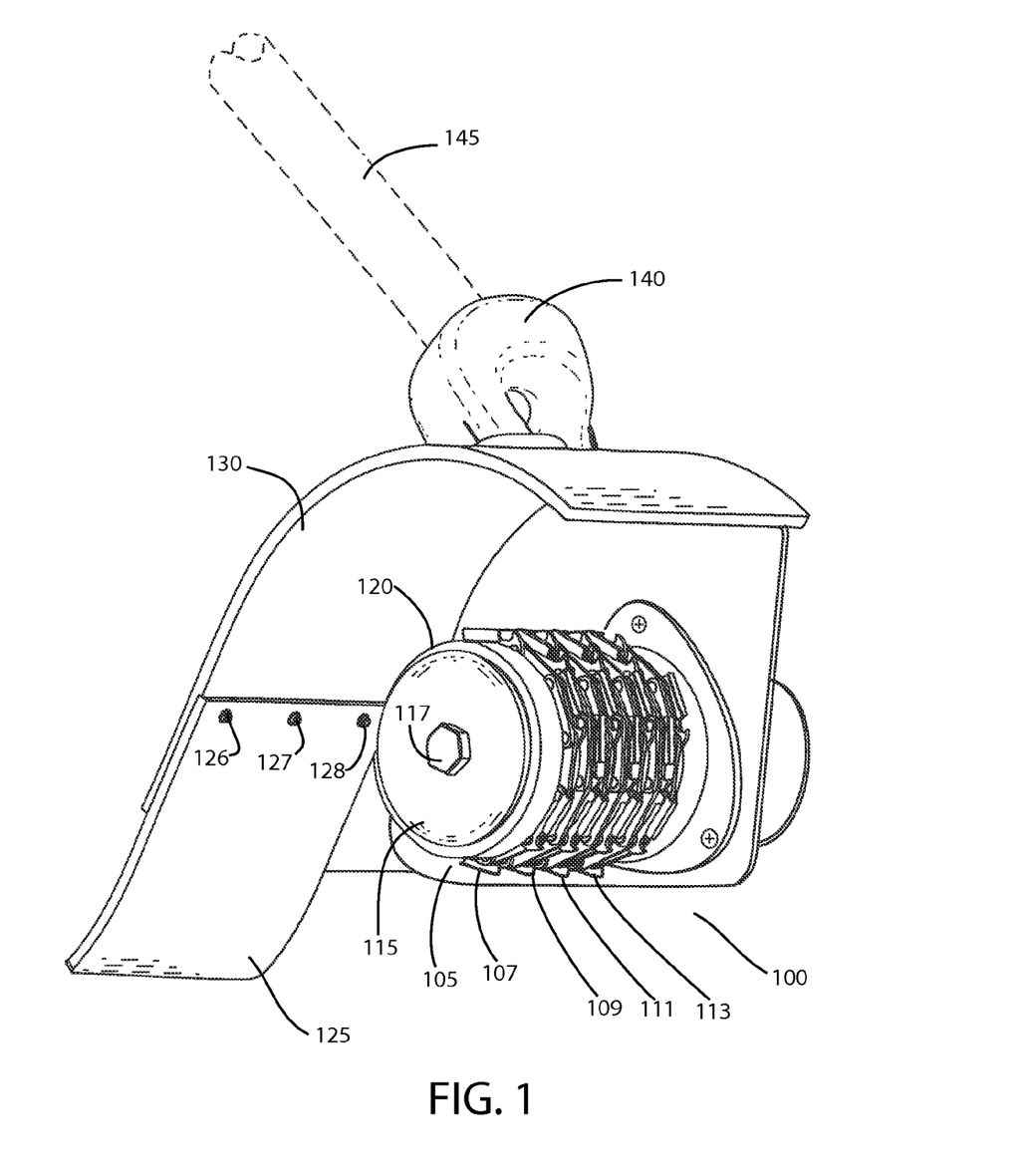
FIG. 1 is a perspective view of an exemplary assembled root resurfacing attachment according to principles of the invention.

Referring to FIG. 1, a perspective view of an exemplary assembled root resurfacing attachment according to principles of the invention is provided. Shaft 145 comprises a part of a gasoline powered landscaping edger, such as, for example, the exemplary edger shown in FIG. 22. An engine 710 causes a cable or drive shaft that extends through the shaft 145 to rotate. Rotation of the cable or drive shaft powers a gear box or transmission 101, which causes a spindle 102 (FIG. 3) to rotate. Rotation of the spindle 102 typically drives a rotating blade used to edge a lawn. However, in accordance with the invention, the blade is removed from the spindle 102. A root resurfacing attachment according to principles of the invention is attached to the spindle 102, as discussed below.

A root resurfacing attachment 100 according to principles of the invention comprises a plurality of parallel spaced apart chainsaw chains 107-113 (hereinafter "cutting chains" or "chains") mounted on a unidirectional rotating hub 105. The hub 105 and chains 107-113 are discussed in greater detail below. An end cap 120, retaining washer 115, bolt 117 and bushing 175 secure the hub and chain assembly to the spindle 102.

A debris shield assembly comprises a shroud 130 that partially surrounds the top and side of the hub 105 and chains 107-113 facing the user to block debris. The shield assembly includes a flexible skirt 125 extends from the bottom of the shield assembly 130. The skirt 125 helps prevent debris from passing beneath the shroud 130. A plurality of attachments, such as screws, rivets, or nuts and bolts 126-128 secure the skirt 125 to the shroud 130. An arm 140 attaches the shroud to the shaft 145.

Figure 2:
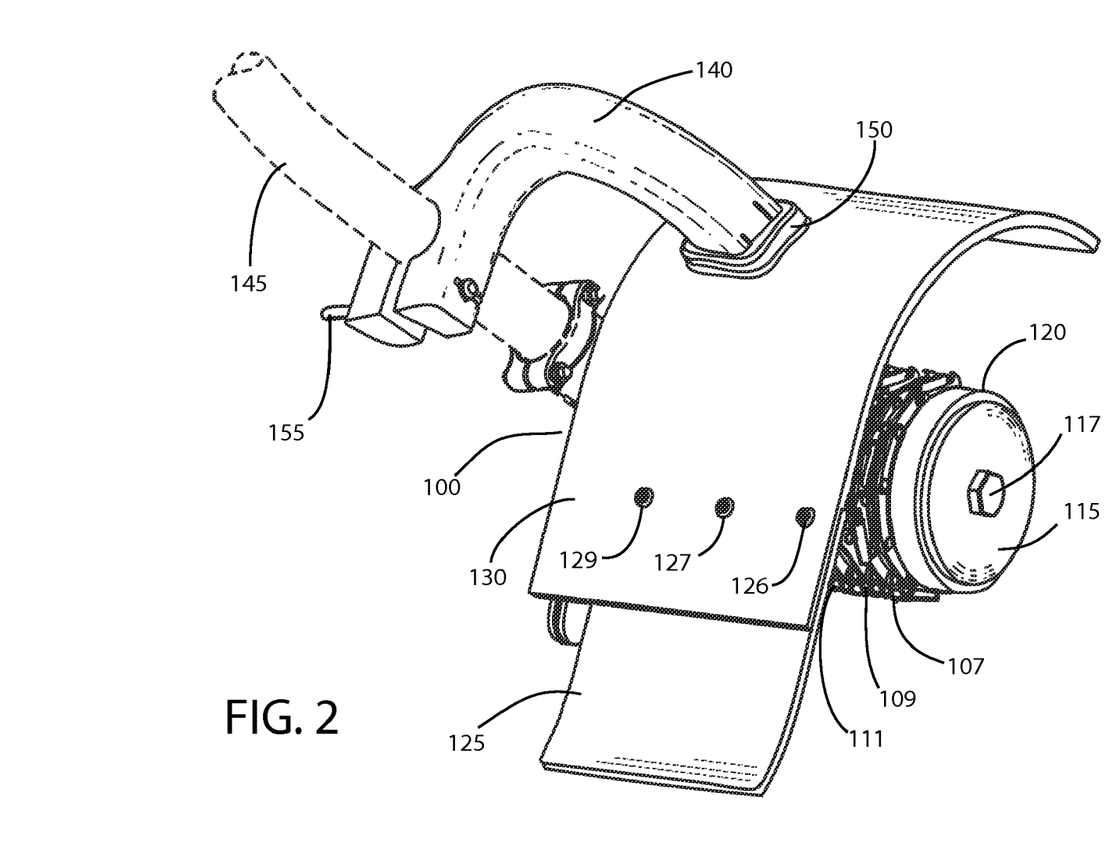
FIG. 2 is another perspective view of an exemplary assembled root resurfacing attachment according to principles of the invention.

FIG. 2 is another perspective view of an exemplary assembled root resurfacing attachment according to principles of the invention. In FIG. 2, the side of the exemplary debris shield assembly that faces the user is clearly shown. Additionally, a one-piece arm 140 clamps onto shaft 145 and attaches to a collar 150 on the shroud 130. The attachment at the collar 150 may be mechanical, such as a screw, rivet, weld, nut and bolt, or a snap-fit connection, or chemical, such as epoxy or other cement or bonding agent. The clamp at the shaft 145 comprises a forked end with a channel sized to receive the shaft 145. The prongs of the forked end are urged together for clamping by tightening a wing bolt 155 and nut 156 (FIG. 3).

Figure 3:
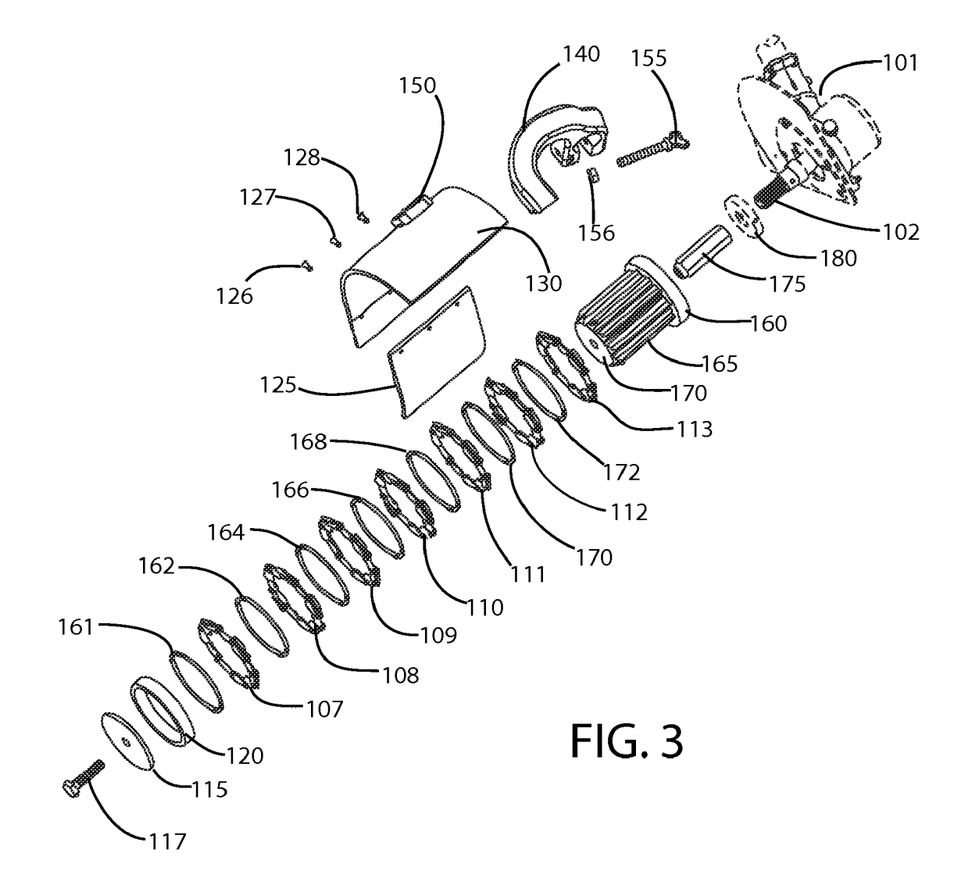
FIG. 3 is an exploded perspective view of an exemplary root resurfacing attachment according to principles of the invention.

FIG. 3 is an exploded perspective view of an exemplary root resurfacing attachment according to principles of the invention. The gearbox or transmission 101 and spindle 102 of the edger are shown. The spindle 102 is a male threaded spindle. A washer 180 or goes between the spindle and bushing 175. The bushing 175 is a noncircular cross-section (e.g., hexagonal) sleeve with a female threaded central channel. The threads mate with the threads of the spindle 102. The bushing 175 fits into a correspondingly shaped central channel in the inboard end of the hub 165. A flange 160 defines the inboard end of the hub 165.

A plurality of parallel endless cutting chains 107-113 are slid onto the hub 165 from the outboard end 170. Each chain is separated from an adjacent chain by a spacer 161-172. The inner diameter of each spacer 161-172 is about the outer diameter of the hub 165 so that each spacer 161-172 may slide onto the hub 165. The outer diameter of each spacer 161-172 is less than the outer diameter of each circular chain loop 107-113 so that the spacers 161-172 do not interfere with cutting. The width of each spacer 161-172 is greater than the width of the horizontal cutting edge of the cutting surfaces of cutting teeth of each circular chain loop 107-113. Thus, the spacers 161-172 prevent interference between adjacent cutting chains.

An end cap 120, retaining washer 115, bolt 117 and bushing 175 secure the hub and chain assembly to the spindle 102. The bolt 117 extends through the central channel of the hub 165 and threads into the central channel of the bushing 175. The retaining washer 115 and bushing 175 secure the chains 107-113 and spacers 161-172 on the hub 165.

Figure 4:
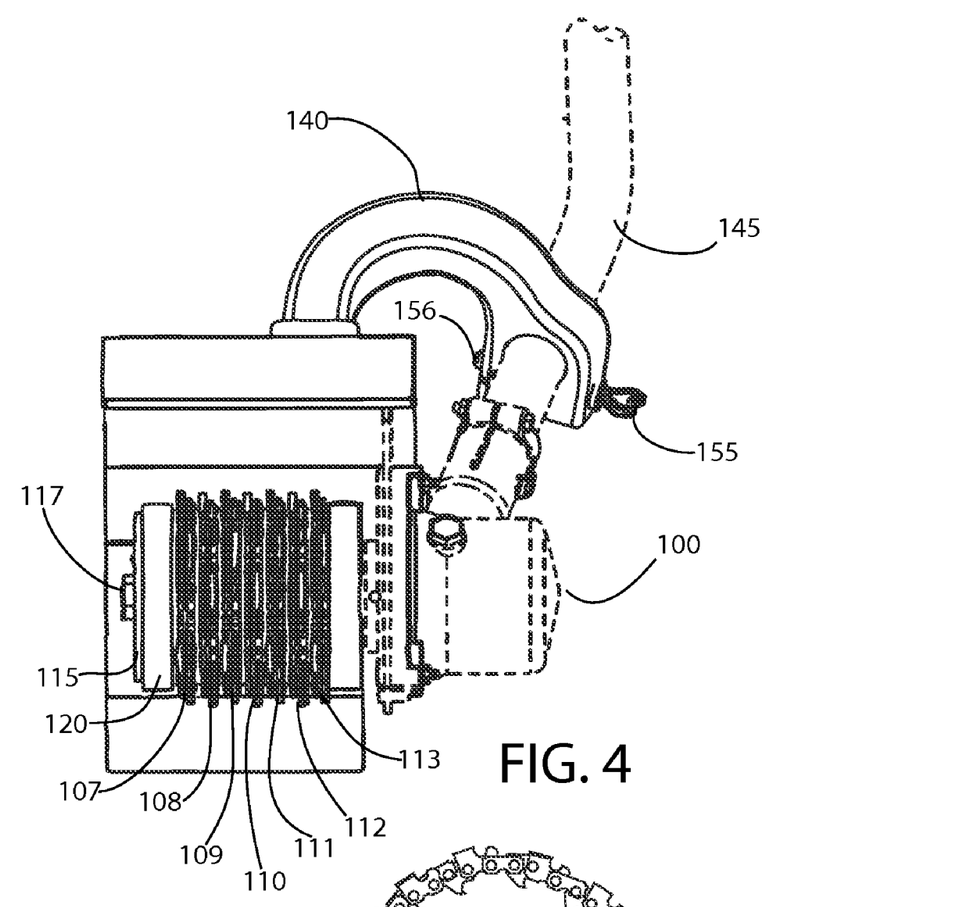
FIG. 4 is another perspective view of an exemplary assembled root resurfacing attachment according to principles of the invention.
Figure 23:
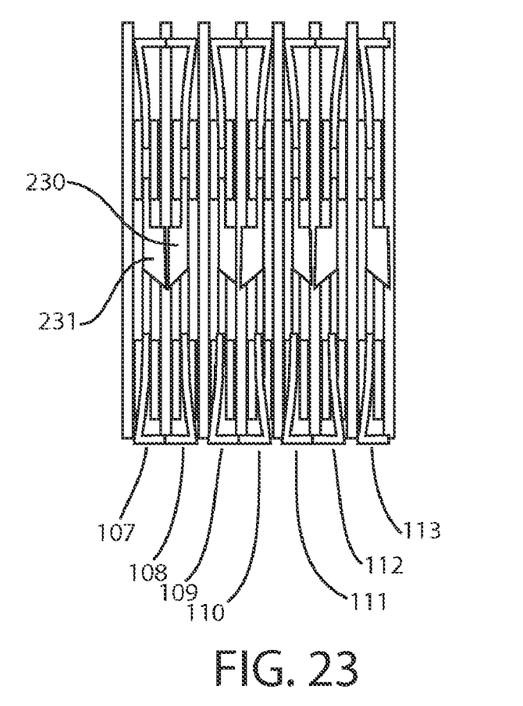
FIG. 23 is a schematic illustrating a plurality of parallel cutting chains for a root resurfacing attachment according to principles of the invention.

Referring now to FIG. 4 another perspective view of an exemplary assembled root resurfacing attachment according to principles of the invention is provided. The spaced apart, parallel, equal diameter cutting chains separated by spacers are visible in this view. Referring to FIG. 23, the parallel cutting chains 107-113 may be positioned with opposed cutting surfaces 230, 231 being aligned but separated.

Figure 5:
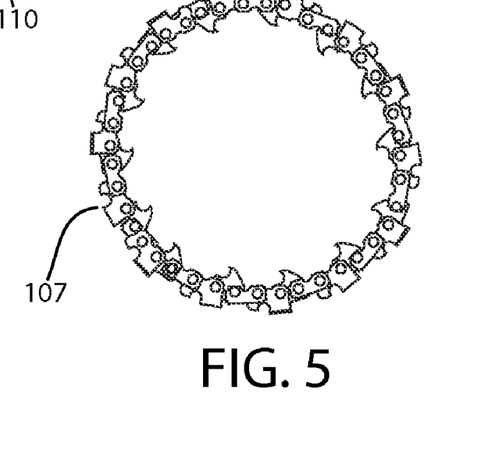
FIG. 5 is profile view of an exemplary endless chainsaw chain for a root resurfacing attachment according to principles of the invention.
Figure 6:
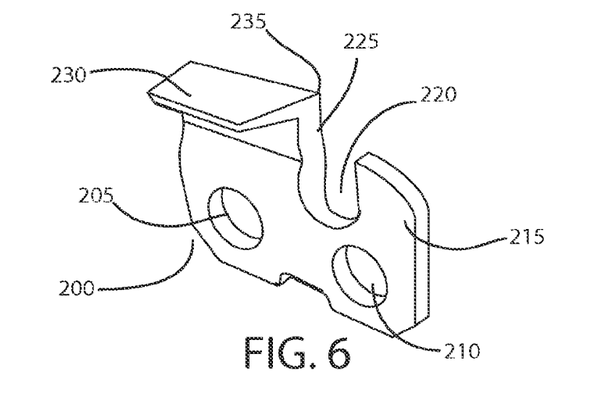
FIG. 6 is perspective view of an exemplary link for a chainsaw chain for a root resurfacing attachment according to principles of the invention.
Figure 7:
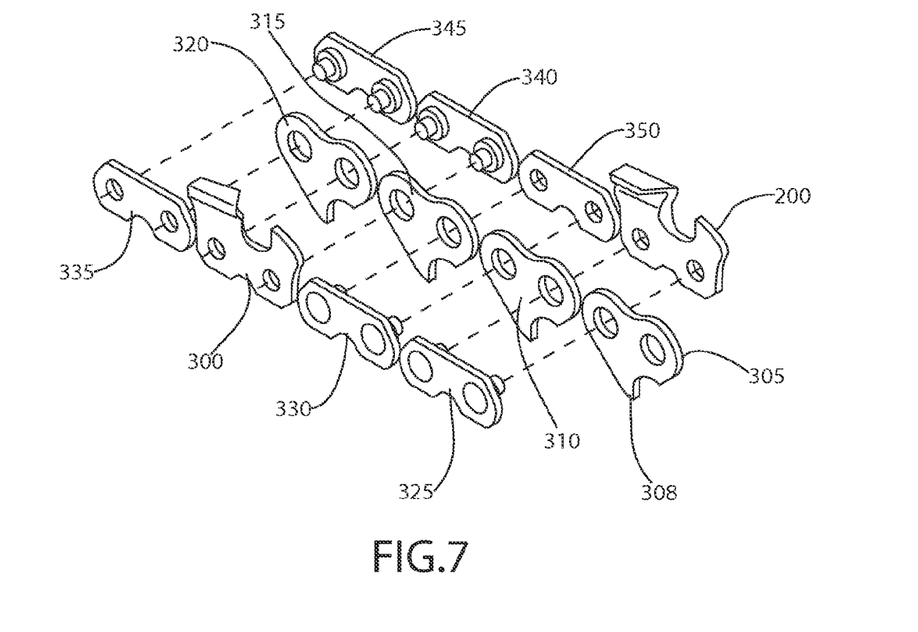
FIG. 7 is perspective view of a plurality of exemplary links for a chainsaw chain for a root resurfacing attachment according to principles of the invention.

FIG. 5 provides a profile view of an exemplary endless chainsaw chain 107 (i.e., a cutting chain) for a root resurfacing attachment according to principles of the invention. An exemplary link 200 and a plurality of exemplary links are shown in FIGS. 6 and 7. Referring to FIG. 6, a link, particularly, a right hand cutter is shown. The cutting chain has left- and right-hand cutters so that the chain will cut evenly through the wood. The right hand cutter 200 includes a top plate 230 (i.e., a cutting surface), cutting corner 235, heel 245, gullet 220, side plate 225, depth gauge 215, toe 240, and rivet holes 205, 210. The depth gauge 215, also referred to as a raker, determines the depth of the cut. With reference to FIG. 7, mating preset tie straps 325, 330, 340, 345, mate with tie straps 335, 350 or right or left cutters 200, 300. A plurality of drive links 305, 308, 310, 315, 320 are disposed between the mated links. The tie straps hold the parts of the saw chain together. The fin 308 of each drive link fits in a groove in the hub 165 so the hub 165 can drive the chain 107-113.

Any of various chain cutter sequences may be used, such as, but not limited to, left-hand cutter, tie strap, right-hand cutter, tie strap, left-hand cutter, tie strap, right-hand cutter, for the length of the chain. Alternatively the sequence may be left-hand cutter, two tie straps, right-hand cutter, one tie strap, left-hand cutter, two tie straps, right-hand cutter, one tie strap, and left-hand cutter, for the length of the chain. Another non-limiting example is a cutter sequence of left-hand cutter, two tie straps, right-hand cutter, two tie straps, for the length of the chain.

Figure 8:
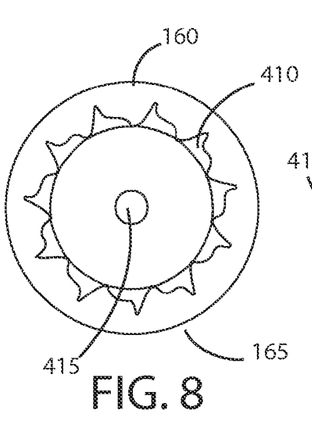
FIG. 8 is an outboard view of an exemplary drive hub for a root resurfacing attachment according to principles of the invention.
Figure 9:
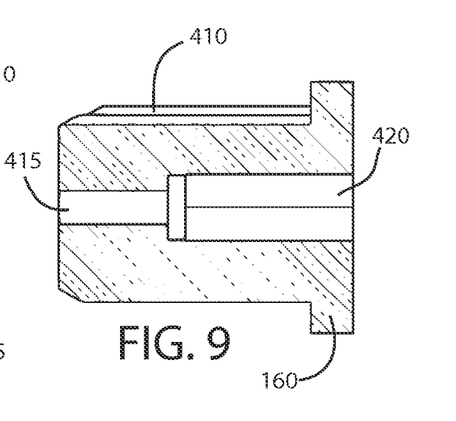
FIG. 9 is section view of an exemplary drive hub for a root resurfacing attachment according to principles of the invention.
Figure 10:
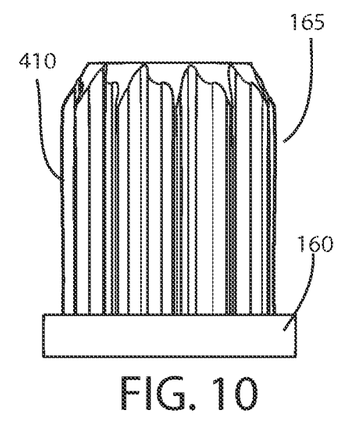
FIG. 10 is a side view of an exemplary drive hub for a root resurfacing attachment according to principles of the invention.
Figure 11:
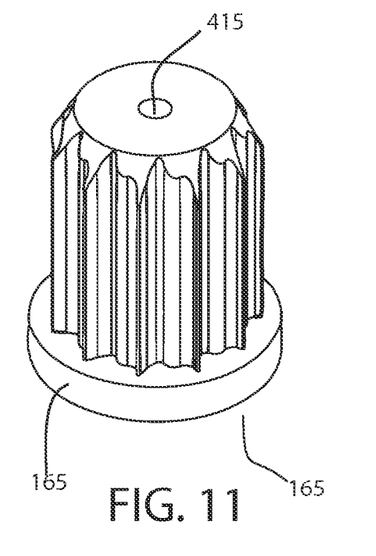
FIG. 11 is a perspective view of an exemplary drive hub for a root resurfacing attachment according to principles of the invention.
Figure 12:
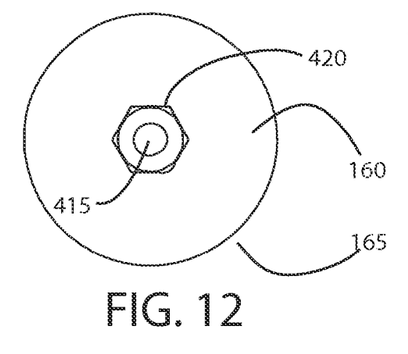
FIG. 12 is an inboard view of an exemplary drive hub for a root resurfacing attachment according to principles of the invention.

FIG. 8 is an outboard view of an exemplary drive hub 165 for a root resurfacing attachment according to principles of the invention. FIGS. 10 and 11 provide side and perspective views of an exemplary drive hub for a root resurfacing attachment according to principles of the invention. The drive hub 165 includes a flange 160. A central channel 415 extends through the outboard end of the hub 165 to a central aperture (i.e., bushing aperture) 420 shaped to receive the noncircular bushing 175, as shown in the section view of FIG. 9. The noncircular (i.e., hexagonal) configuration of the bushing aperture is also shown in FIG. 12. A plurality of ribs 410 extend radially. The fin 308 of each drive link 305, 308, 310, 315, 320 fits in a groove in the hub 165 so the hub 165 can drive the chain 107-113. As the fin 308 and v-groove 412 are correspondingly curved, the fin 308 mates with the v-groove 412 in one direction only. This arrangement makes the hub and chain unidirectional so that the cutting links lead with their cutting edges in the direction of rotation. This unidirectional configuration prevents mounting the chain backwards.

Figure 13:
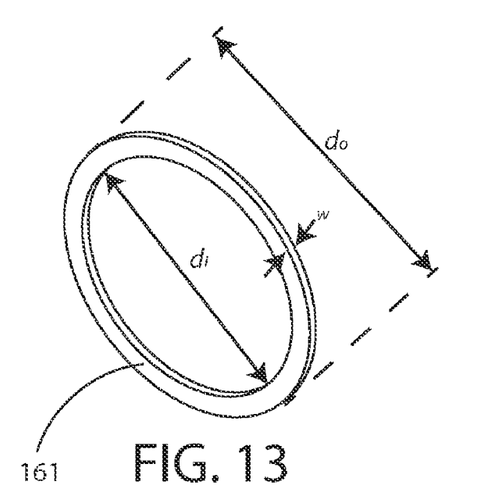
FIG. 13 is a perspective view of an exemplary chain spacer washer for a root resurfacing attachment according to principles of the invention.

Referring now to FIG. 13, a perspective view of an exemplary chain spacer washer for a root resurfacing attachment according to principles of the invention is shown. The inner diameter $d_i$ of the spacer 161 is about the outer diameter of the hub 165 so that the spacer 161 may slide onto the hub 165. The outer diameter $d_o$ of the spacer 161 is less than the outer diameter of each circular chain loop 107-113 so that the spacer 161 does not interfere with cutting. The width w of the spacer 161 is greater than the width of the horizontal cutting edge of the cutting surfaces of cutting teeth of each circular chain loop 107-113. Thus, the spacer 161 prevents interference between adjacent cutting chains.

Figure 14:
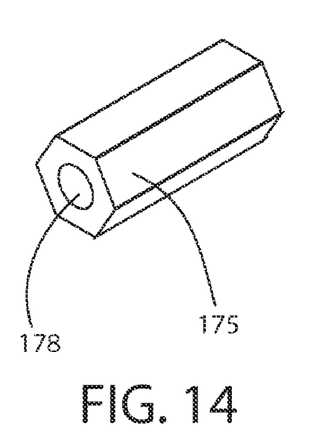
FIG. 14 is a perspective view of an exemplary drive shaft adapter for a root resurfacing attachment according to principles of the invention.
Figure 15:
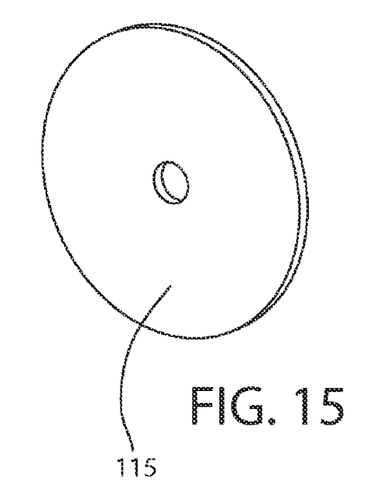
FIG. 15 is a perspective view of an exemplary outboard washer for a root resurfacing attachment according to principles of the invention.

FIG. 14 is a perspective view of an exemplary drive shaft adapter (i.e., bushing) 175 for a root resurfacing attachment according to principles of the invention. The bushing 175 is a noncircular cross-section (e.g., hexagonal) sleeve with a female threaded central channel 178. The threads mate with the threads of the spindle 102. The bushing 175 fits into a correspondingly shaped central channel 420 in the flanged inboard end 160 of the hub 165 (FIGS. 9 and 12). The end cap 120, retaining washer 115 (FIG. 15), bolt 117 and bushing 175 secure the hub and chain assembly to the spindle 102. The bolt 117 extends through the central channel of the hub 165 and threads into the central channel of the bushing 175. The retaining washer 115 and bushing 175 secure the chains 107-113 and spacers 161-172 on the hub 165, by preventing them from sliding off the outboard end. Together, the retaining washer 115 and end cap 120 provide a removable outboard flange assembly that has an outer diameter greater than that of the hub 165, but less than the outer diameter of the chains, and prevents removal or dislodgment of the chains and spacers retained on the hub 165, without interfering with cutting action.

Figure 16:
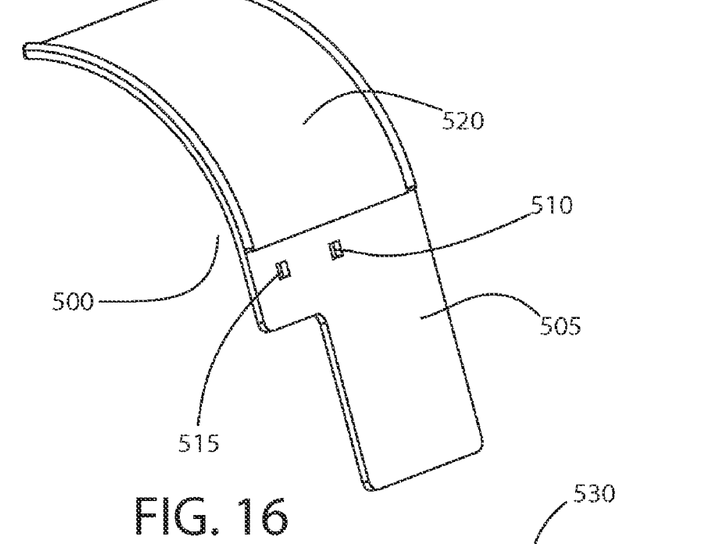
FIG. 16 is a perspective view of an exemplary shield for a root resurfacing attachment according to principles of the invention.

FIG. 16 provides a perspective view of an exemplary shield assembly 500 for a root resurfacing attachment according to principles of the invention. This shield includes a base 505 and a flexible cover 520, which covers the downwardly curved portion of the shield assembly 500. A pair of spaced apart mounting holes are provided. The shield 500 is shown mounted to a weed trimmer in FIG. 24.

Figures 17, 18, 19:
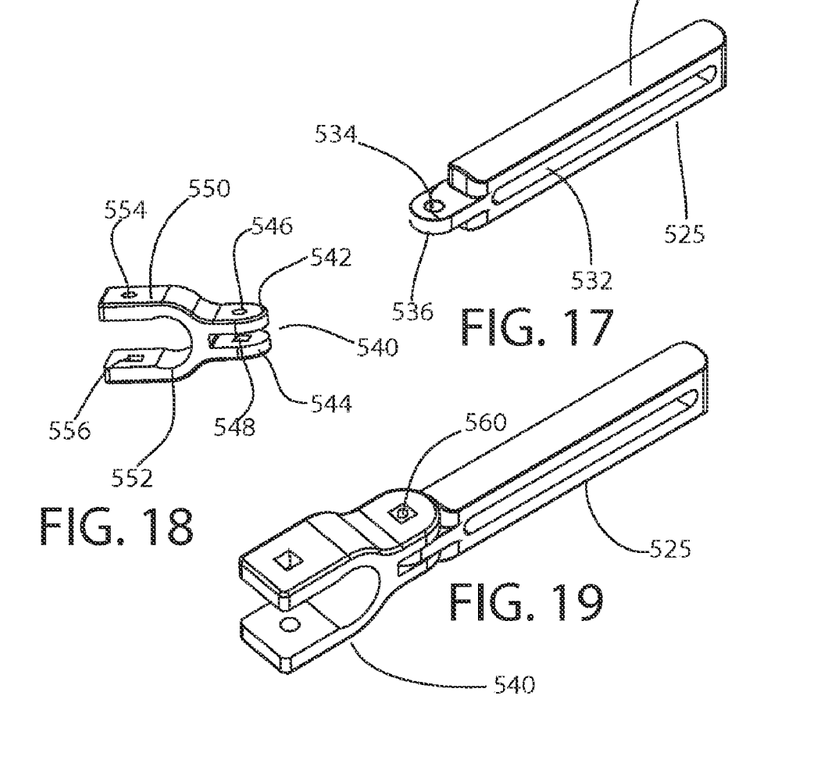
FIG. 17 is a perspective view of an exemplary support arm for a shield for a root resurfacing attachment according to principles of the invention.
FIG. 18 is a perspective view of an exemplary shaft clamp for a shield for a root resurfacing attachment according to principles of the invention.
FIG. 19 is a perspective view of an exemplary shaft clamp and support arm assembly for a shield for a root resurfacing attachment according to principles of the invention.
Figure 24:
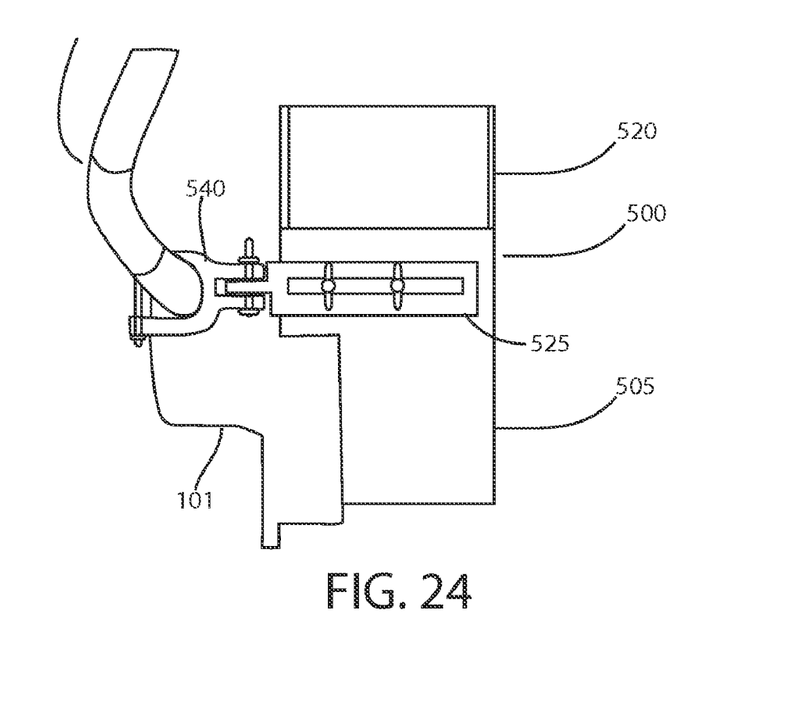
FIG. 24 is a view of an exemplary shield attached to a gasoline powered edger.

A mounting arm assembly as shown in FIG. 19, is comprised of a clamp 540 (FIG. 18) and a pivoting extension arm 525 (FIG. 17) that attaches the shield assembly 500 to the shaft 145, as also shown in FIG. 24. The clamp 540 grabs onto shaft 145. The clamp 540 comprises opposed forked ends, each with a pair of prongs 550, 552 defining a channel sized to receive the shaft 145 at one end and a pair of prongs 544, 546 defining a channel sized to receive a tenon 536 extending from the arm 525. A wing bolt 155 extends through holes 554, 556 in the shaft fork and a nut 156 allows tightening for clamping, as illustrated in (FIG. 3). A screw extends through the holes 534, 546, 548 in the tenon 536 and arm fork 542, 544. A nut tightens the screw in place and resists pivoting. The joint thus created, when loose, pivots about the axis defined by the screw. The arm attaches to the base 505 of the shield 500 using screws that extend through the elongated slot and the holes 510, 515 in the base of the shield 500.

Figure 20:
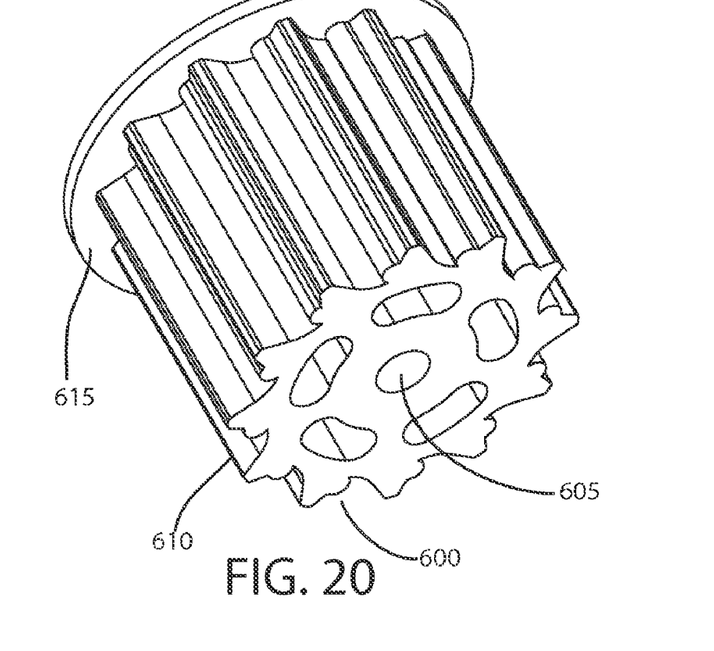
FIG. 20 is a perspective view of another exemplary drive hub for a root resurfacing attachment according to principles of the invention.
Figure 21:
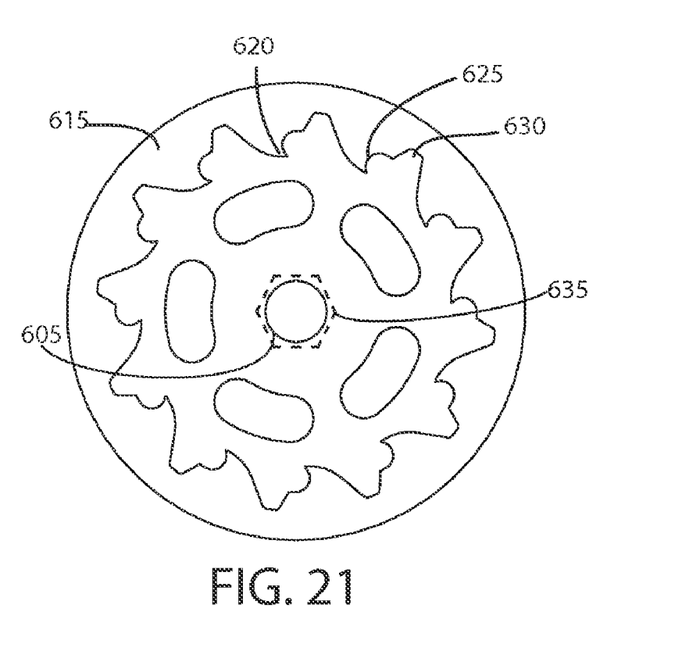
FIG. 21 is an outboard end view of the other exemplary drive hub for a root resurfacing attachment according to principles of the invention.

FIGS. 20 and 21 provide perspective and outboard views of another exemplary drive hub 600 for a root resurfacing attachment according to principles of the invention. The drive hub 600 includes an inboard flange 615. A central channel 605 extends through the outboard end of the hub 600 to a central aperture (i.e., bushing aperture) 635 shaped to receive the noncircular bushing 175, as shown in the section view of FIG. 9. A plurality of ribs 630 extend radially. The fin 308 of each drive link 305, 308, 310, 315, 320 fits in a groove 620 in the hub 600 so the hub 600 can drive the chain 107-113. A rounded protuberance 625 has a radius of curvature that corresponds to the radius of curvature of the fin 308 of each drive link 305, 308, 310, 315, 320. As the fin 308 and v-groove 620 and protuberance 625 are correspondingly curved, the fin 308 mates with the v-groove 620 and protuberance 625 in one direction only. This arrangement makes the hub and chain unidirectional so that the cutting links lead with their cutting edges in the direction of rotation. This unidirectional configuration prevents mounting the chain backwards.

Figure 22:
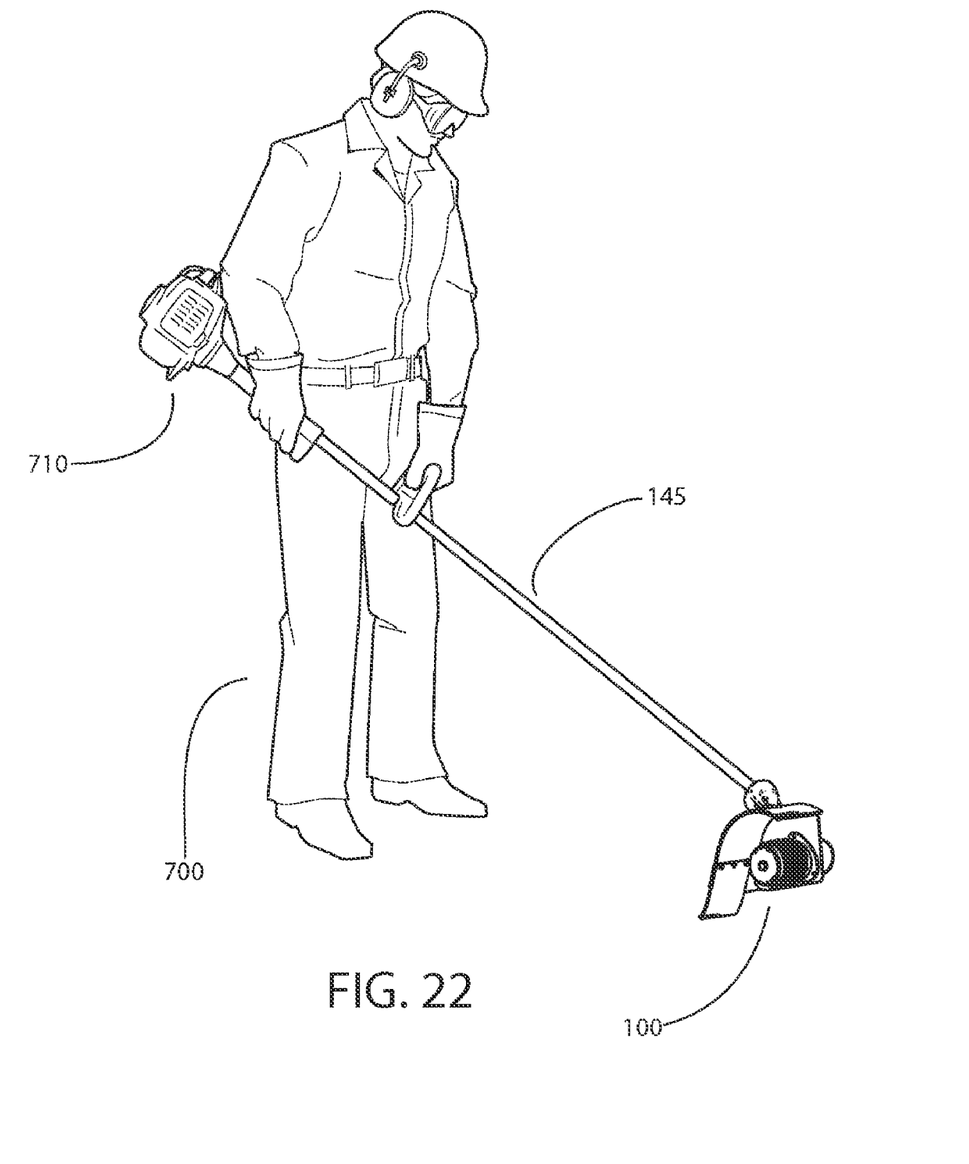
FIG. 22 is a perspective view of an exemplary resurfacing attachment according to principles of the invention attached to a gasoline powered edger and being used by a worker.

FIG. 22 is a perspective view of an exemplary resurfacing attachment according to principles of the invention attached to a gasoline powered edger and being used by a worker 700.

Shaft 145 comprises a part of a gasoline powered landscaping edge. An engine 710 causes a cable or drive shaft that extends through the shaft 145 to rotate. Rotation of the cable or drive shaft powers a gear box or transmission 101, which causes a spindle 102 (FIG. 3) to rotate. Rotation of the spindle 102 typically drives a rotating blade used to edge a lawn. However, in accordance with the invention, the blade is removed from the spindle 102. A root resurfacing attachment 100 according to principles of the invention is attached to the spindle 102, as discussed below.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A root resurfacing attachment for a landscaping edger having a rotating threaded spindle, said root resurfacing attachment comprising:
   a rotating hub comprising
      an axial core with an inboard end and an opposite outboard end;
      an inboard flange at the inboard end, said inboard flange having a first outer diameter;
      a plurality of evenly spaced ribs extending radially from the axial core, said ribs defining a second outer diameter;
      a central bushing channel extending from the inboard flange into the axial core, said central bushing channel having a noncircular cross section; and
      a central flange channel extending from the outboard end of the axial core to the central bushing channel; and
   a removable outboard flange assembly attachable to the outboard end of the rotating hub, said outboard flange assembly having a third outer diameter; and
   an outboard flange attachment configured to attach the removable outboard flange assembly to the outboard end of the rotating hub; and
   an inboard spindle bushing comprising
      a noncircular cross section sleeve configured to fit snugly in the central bushing channel, and
      a central threaded channel extending axially through the inboard spindle bushing and being threaded to threadedly engage the rotating threaded spindle of the landscaping edger; and
   a plurality of parallel spaced-apart endless cutting chain loops, each cutting chain loop having an inner periphery and inner diameter, an outer periphery and outer diameter, and comprising an endless loop of connected chainsaw chain links, including a plurality of cutting links, drive links, and tie straps, each cutting link including a cutting surface at the outer periphery, each drive link including a rib engaging fin at the inner periphery; and a plurality of spaced-apart spacer rings, each spacer ring having an inner periphery and inner diameter, an outer periphery and outer diameter, and a width, and each spacer ring being disposed between adjacent cutting chain loops, the outer diameter of the spacer rings being less than the outer diameter of the cutting chain loops, and the inner diameter of the spacer rings allowing the spacer rings to slide onto the rotating hub.

2. The root resurfacing attachment for a landscaping edger according to claim 1, wherein the first outer diameter is greater than the second outer diameter and the third outer diameter is greater than the second outer diameter.

3. The root resurfacing attachment for a landscaping edger according to claim 2, wherein the outboard flange attachment comprises a bolt having a threaded shank configured to extend through the central flange channel and threadedly into the inboard spindle bushing within the central bushing channel.

4. The root resurfacing attachment for a landscaping edger according to claim 3, wherein the plurality of evenly spaced ribs extending radially from the axial core define a plurality of grooves comprising one groove between each adjacent pair of evenly spaced ribs.

5. The root resurfacing attachment for a landscaping edger according to claim 4, wherein the rib engaging fin of each drive link is shaped and sized to extend into one of the grooves between each adjacent pair of evenly spaced ribs.

6. The root resurfacing attachment for a landscaping edger according to claim 3, wherein the plurality of evenly spaced ribs extending radially from the axial core define a plurality of curved grooves comprising one curved groove between each adjacent pair of evenly spaced ribs and the drive links are configured to be driven in one rotational direction for cutting.

7. The root resurfacing attachment for a landscaping edger according to claim 6, wherein the rib engaging fin of each drive link is shaped and sized to extend into one of the curved grooves between each adjacent pair of evenly spaced ribs and the drive links are configured to be driven in one rotational direction for cutting.

8. The root resurfacing attachment for a landscaping edger according to claim 3, wherein each cutting surface of each cutting link comprises a top plate, cutting corner, heel, gullet, side plate, depth gauge, toe, and rivet holes.

9. The root resurfacing attachment for a landscaping edger according to claim 8, wherein the plurality of cutting links includes right-hand cutters and left-hand cutters.

10. The root resurfacing attachment for a landscaping edger according to claim 8, wherein the plurality of cutting links includes right-hand cutters and left-hand cutters, each of the cutting links having a cantilevered top plate with a free end, and cutting links on adjacent cutting chain loops being aligned.

11. The root resurfacing attachment for a landscaping edger according to claim 8, wherein the plurality of cutting links includes right-hand cutters and left-hand cutters, each of the cutting links having a cantilevered top plate with a free end, and the width of spacer ring being sufficient to prevent cutting links from contacting an adjacent cutting chain loop.

12. The root resurfacing attachment for a landscaping edger according to claim 1, further comprising a shield assembly disposed between the rotating hub and a user, and a connecting arm assembly attaching the shield assembly to a shaft of the landscaping edger.

13. The root resurfacing attachment for a landscaping edger according to claim 12, said shield assembly comprising a base to which the connecting arm assembly attaches and a skirt extending downwardly from the base.

14. The root resurfacing attachment for a landscaping edger according to claim 12, said arm assembly comprising a one-piece arm with a forked end for clamping the shaft of the landscaping edger.

15. The root resurfacing attachment for a landscaping edger according to claim 12, said arm assembly comprising a multi-piece arm with a forked end for clamping the shaft of the landscaping edger.

16. The root resurfacing attachment for a landscaping edger according to claim 12, said arm assembly comprising a multi-piece arm with pivoting joint and a forked end for clamping the shaft of the landscaping edger.

17. A landscaping edger having a rotating threaded spindle to which a root resurfacing attachment is attached, said root resurfacing attachment comprising:

a rotating hub comprising
an axial core with an inboard end and an opposite outboard end;
an inboard flange at the inboard end, said inboard flange having a first outer diameter;
a plurality of evenly spaced ribs extending radially from the axial core, said ribs defining a second outer diameter;
a central bushing channel extending from the inboard flange into the axial core, said central bushing channel having a noncircular cross section; and
a central flange channel extending from the outboard end of the axial core to the central bushing channel; and a removable outboard flange assembly attachable to the outboard end of the rotating hub, said outboard flange assembly having a third outer diameter; and an outboard flange attachment configured to attach the removable outboard flange assembly to the outboard end of the rotating hub; and an inboard spindle bushing comprising
a noncircular cross section sleeve configured to fit snugly in the central bushing channel, and
a central threaded channel extending axially through the inboard spindle bushing and being threaded to threadedly engage the rotating threaded spindle of the landscaping edger; and a plurality of parallel spaced-apart endless cutting chain loops, each cutting chain loop having an inner periphery and inner diameter, an outer periphery and outer diameter, and comprising an endless loop of connected chainsaw chain links, including a plurality of cutting links, drive links, and tie straps, each cutting link including a cutting surface at the outer periphery, each drive link including a rib engaging fin at the inner periphery; and a plurality of spaced-apart spacer rings, each spacer ring having an inner periphery and inner diameter, an outer periphery and outer diameter, and a width, and each spacer ring being disposed between adjacent cutting chain loops, the outer diameter of the spacer rings being less than the outer diameter of the cutting chain loops, and the inner diameter of the spacer rings allowing the spacer rings to slide onto the rotating hub, wherein the first outer diameter is greater than the second outer diameter and the third outer diameter is greater than the second outer diameter, and the outboard flange attachment comprises a bolt having a threaded shank configured to extend through the central flange channel and threadedly into the inboard spindle bushing within the central bushing channel, and the plurality of evenly spaced ribs extending radially from the axial core define a plurality of grooves comprising one groove between each adjacent pair of evenly spaced ribs, and the rib engaging fin of each drive link is shaped and sized to extend into one of the grooves between each adjacent pair of evenly spaced ribs, and the width of spacer ring being sufficient to prevent cutting links from contacting an adjacent cutting chain loop.

18. The root resurfacing attachment for a landscaping edger according to claim 17, further comprising a shield assembly disposed between the rotating hub and a user, and a connecting arm assembly attaching the shield assembly to a shaft of the landscaping edger.

19. The root resurfacing attachment for a landscaping edger according to claim 17, said shield assembly comprising a base to which the connecting arm assembly attaches and a skirt extending downwardly from the base.

20. The root resurfacing attachment for a landscaping edger according to claim 17, said arm assembly comprising a forked end for clamping the shaft of the landscaping edger.

* * * * *